(12) United States Patent
Zhou

(10) Patent No.: US 7,512,666 B2
(45) Date of Patent: Mar. 31, 2009

(54) GLOBAL NETWORK OF WEB CARD SYSTEMS AND METHOD THEREOF

(75) Inventor: Hongyi Zhou, Beijing (CN)

(73) Assignee: Yahoo! Inc., Sunnyvale, CA (US)

( * ) Notice: Subject to any disclaimer, the term of this patent is extended or adjusted under 35 U.S.C. 154(b) by 254 days.

(21) Appl. No.: 09/837,505

(22) Filed: Apr. 18, 2001

(65) Prior Publication Data

US 2002/0156862 A1 Oct. 24, 2002

(51) Int. Cl.
G06F 15/16 (2006.01)
G06F 7/00 (2006.01)
G06F 17/30 (2006.01)

(52) U.S. Cl. .............................. 709/217; 707/3; 707/4; 707/5

(58) Field of Classification Search ........................ None
See application file for complete search history.

(56) References Cited

U.S. PATENT DOCUMENTS

| 5,640,565 | A | * | 6/1997 | Dickinson | 707/103 R |
| 5,842,206 | A | * | 11/1998 | Sotomayor | 707/5 |
| 6,161,144 | A | * | 12/2000 | Michels et al. | 709/238 |
| 6,587,819 | B1 | * | 7/2003 | Lu | 704/257 |
| 6,807,539 | B2 | * | 10/2004 | Miller et al. | 707/3 |
| 6,848,080 | B1 | * | 1/2005 | Lee et al. | 715/203 |
| 6,983,322 | B1 | * | 1/2006 | Tripp et al. | 709/225 |
| 7,058,626 | B1 | * | 6/2006 | Pan et al. | 707/4 |

OTHER PUBLICATIONS

Andresen, Daniel, "Scalability Issues for High Performance Digital Libraries on the World Wide Web," May 1996, IEEE, pp. 139-148.*
Zhu, Huican et al, "Adaptive Load Sharing for Clustered Digital Library Servers," Jul. 1998, IEEE, pp. 235-242.*

* cited by examiner

Primary Examiner—Patrice Winder
Assistant Examiner—Azizul Choudhury
(74) Attorney, Agent, or Firm—Michael Fedrick; Sheldon Mak Rose & Anderson PC

(57) ABSTRACT

A global network of systems of personal and business information management comprises a plurality of servers, each server having at least a local database and a local search engine, and a plurality of users' equipment that are accessible to the Internet and thus connectable with at least one of the servers. Each of the databases contains at least some of personal data and information of individuals who are located within a particular geographic area or sign on with a particular server. The servers have at least one uniform search interface one of said servers functions as a master server, and the web card servers communicate with each other through predetermined protocols to connect with the other servers.

18 Claims, 12 Drawing Sheets

PERSONAL INFO

| | |
|---|---|
| NAME | Shi Xiaohong |
| NICK | smith |
| HOME TEL | 01065947351 |
| HOME FAX | 01065812440 |
| MOBIL | 13601234567 |
| BP | 191-1234567 |
| PRIVATE EMAIL | [给我写信] |
| PERSONAL HOMEPAGE | http://wap.3721.com |
| HOME ADDR | Xi Da Wang Rd., Chao Yang Dis. Beijing, P.R.C. |
| ZIP | 100027 |

OFFICE INFO

| | |
|---|---|
| CORPRATION | InterChina Software Co. Ltd |
| DEPARTMENT | R&D |
| POSITION | programmer |
| OFFICE PHONE | (86)01065812445 |

OTHER INFO

| | |
|---|---|
| OICQ NO | 23614683 |
| OTHER EMAIL | sxh2@3721.com |
| BIRTHDAY | 10/09 |
| BLOOD TYPE | AB型 |
| CONSTELLATION | Libra |

FIG 2B

Memory structure(array,link list,etc) to store web cards data

Hash table index entry for name search (64K Unicode Chars)

a list of pointer, each points to a card whose name is '李伟锋'

Hash table index entry for Pinyin and Tongyin search a list of pointer, each points to a card whose name has the prounoucation 'li wei feng'

Memory structure(array,link list,etc) to store web cards data
(the same structure as Fig3A)

Hash table index entry for fuzzy search
(64K Unicode Chars)

a list of pointer, each points to a card whose name or additional information include the word '国风因特'

GLOBAL NETWORK OF WEB CARD SYSTEMS AND METHOD THEREOF

FIELD OF THE INVENTION

The present invention relates to a network of online personal information management systems, more particularly to a global network of systems of personal and business web cards, and a method of managing and controlling the network of systems of personal and business web cards.

BACKGROUND OF THE INVENTION

Up to now, most all of electronic personal information management (PIM) systems are localized personal information management systems, in which individuals or users of the systems enter the personal data of their own and of their friends or contacts. Such systems are provided in individual electronic apparatus, such as personal computers, palm top computers, or any other kinds of electronic organizers, most using Microsoft Outlook, Lotus, or other address books. However, some of those electronic apparatus may not be easily carried around, some may not be kept handy, and some may not be updated often although certain synchronization software are available. Thus, it indeed causes inconsistency of data stored in various personal electronic apparatus a person may have.

Therefore, several web-based personal information management systems have been established to provide the remote storage and database of personal information, that are accessible through a network, such as addresses, calendars, and contacts. Such systems are, for instance, www.ecode.com, www.planetall.com, and www.backup.com. The eCode provides the personal information in electronic card format. Further, there are many existing online telephone directory services in various formats, such as "yellow pages" or "white pages." With the establishment of remote storage and databases of personal information management, the accompanying technology of accessing such databases has been gradually developed. For instance, the Contact Networks, Inc. has several pending patent applications, e.g., WO 00/67105, WO 00/67106, WO 00/67108, WO 00/67416.

WO 00/67105 discloses a method and apparatus for publishing and synchronizing selected user information over a network. It describes a kind of virtual personal information cards that may be communicated to various receiving users under the control of the publishing user. When the publishing user changes the personal information, such changes will be propagated to all holders of the publishing user's card. However, it dose not teach how the card search is conducted more efficiently, and how such a system can be adopted for various users of different languages. Nor it teaches a concept of global network of personal and business web card systems.

In almost all of such remote PIM database systems, each entry of such names, telephones, and sometimes addresses can be searched using exact matching words, such as names and telephone numbers, etc. If the entered inquiry cannot exactly match the entry of information, several closest possible entries may be provided for selection. However, quite often the search may end up with a result of "no matching entry." Thus, the searcher may have to modify the inquiry again and again. Finally, the searcher might give up because of frustration of repeatedly modification of inquiries when no result can be generated through several attempts. This is because most of the time the searcher lacks accurate description of the person being searched, for instance, lacking of correct spelling of the words or exact matching characters to get the correct result, not just some phonetic equivalent words or characters. The problem for such search is the requirement of completely or exact "matching" of the search words with the words of entry or entries. No matching, no result.

In case of searching somebody with whom you do not have any contact for quite a while or someone you just ran into once or twice, you probably do not have much information about him or her. You could hardly remember his or her name. Or sometimes, you lost your collection of business cards or databank or simply you do not have such information handy. Nonetheless, you do know something about him or her, such as where he or she studied, lived or worked before, his or her nickname, or what his or her hobby was etc. In any event, you do have a desire or necessity to find him or her for whatever reason is, but do not have accurate contact information. Using the aforesaid traditional search method searching a particular network or website, you will probably get nothing, or may have to try tens or hundreds of times before you finally get the information you want. In the real life, no-body would like to try too many times to get a simple search result. Therefore, how we could intelligently find someone's information without too much trouble has become a problem waiting to be solved.

Nowadays, Internet accessible electronic information management apparatus are widely used and becoming more and more popular, such as mobile phones, pagers, notebook computers, palm top computers, or any kind of personal computers or data apparatus. You may find an access to such instruments anywhere, such as offices, schools, homes, stores, libraries, or other public facilities. If you are traveling or just away from your own home or office where you usually keep your personal information files or cards, you might think of using the Internet to get what you want. If there were a reliable service on the Internet providing a readily available and accurately accessible database for all of individuals, anyone could then get the contact information of someone wanted from anywhere.

At present, the world is getting closer and closer. Perhaps, someone you want to find may be located or relocated in a different geographic location from yours. Maybe the person, whom you ran into, is in a different country, and speaks a different language. Therefore, there is a necessity to create a network or a global network of systems of personal and business information management, such that anyone may search through the global network of web cards to find the desired information.

Accordingly, it is an object of the present invention to create a network of systems on the Internet that provides a service of personal information search, through which any Internet user may obtain a piece of desired information of someone from anywhere.

It is another object of the present invention to provide a global network of personal and business web card systems that contain necessary information of individuals of different geographic locations and different cultural backgrounds in different languages.

It is still another object of the present invention to provide a network of database systems that can be quickly and effectively searched using native languages.

SUMMARY OF THE INVENTION

According to the present invention, a network of systems of personal and business information management comprises a plurality of servers, each server having at least a local database and a local search engine, and a plurality of users' equipment that are accessible to the Internet and thus connectable with at least one of the servers. Each of the databases contains at least some of personal data and information of individuals who are located within a particular geographic area or sign on with a particular server of the aforesaid plurality of servers, as an Internet Service Provider (ISP). The database may contain a plurality of sub-databases for a variety of categories of individuals or businesses. Anyone who has access to one of the aforesaid servers may search any such personal or business information from the database.

Such electronic equipment may include individual Internet users' computers, data apparatus, and cellular phones. Thus, the individual Internet users may have an instant access to one of the aforesaid servers to search and exchange any desired information from the database of the aforesaid server. And certainly the individual users may also update their information files through synchronizing with the server.

The aforesaid plurality of electronic equipment being connected to the aforesaid servers may also include intranets with internal databases, other ISPs of their own databases, and even public telephone service providers and cellular telephone service providers of their own databases. Those databases may be equipped with firewall to protect themselves once they are connected to the aforesaid particular server. Further, the individual users may search from other databases in other of the aforesaid servers through the Internet, while any intranet users may access the aforesaid server through their own intranet or local area network (LAN). The most important is that such connected databases and individuals' equipment may be synchronized with any of the databases of the aforesaid servers.

Alternatively, there may be a master server or central control server, that monitors and controls the data and search traffic among the servers, and transmits the updates in any of the servers to other servers or public users. Therefore, any update of personal or business information can be simultaneously updated in all equipment.

The present invention can be better understood through the following detailed description in connection with the accompanying drawings.

BRIEF DESCRIPTION OF THE DRAWINGS

FIG. 2A-C show the appearance of the interactive screen of the present invention;

DETAILED DESCRIPTION OF THE INVENTION

Figure 1A:
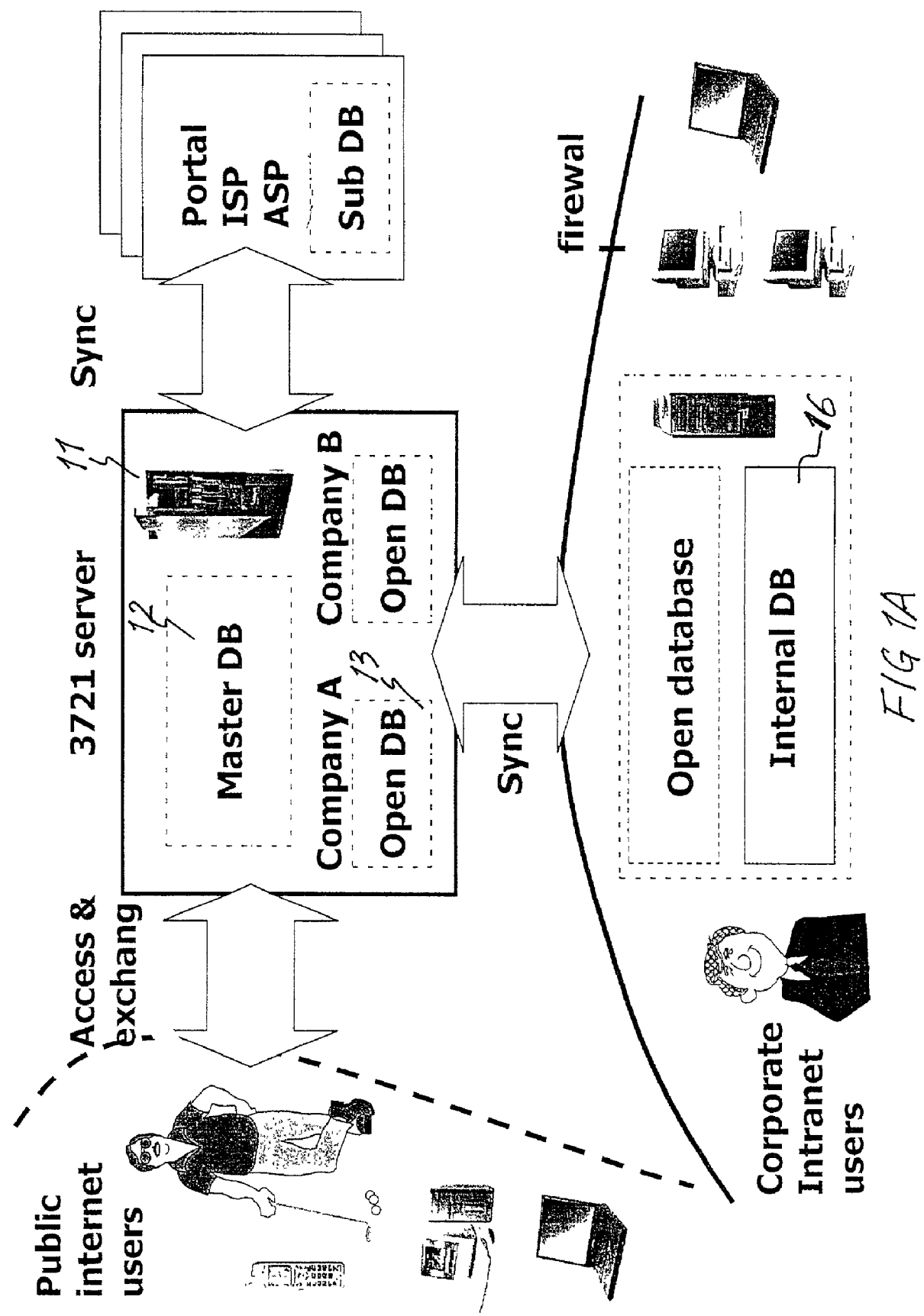
FIG. 1A is illustrative of the system of the present invention.

With reference to FIG. 1A, a server 11, as marked 3721™ server, contains a master database 12, and sub-databases 13, such as company A and company B's databases. The various electronic equipment are the public Internet users' tools to access the Internet and then search the 3721™ server 11, such as lap top computers, personal computers, cell phones, and other data apparatus. No matter where they are located, they may conduct a search at the 3721™ server when they log on the Internet. FIG. 1 shows that the public individual users are linked directly to the 3721™ server 11. However, the individual users may also be linked to a portal ISP 14 or ASP 15, and in turn the ISP 14 or ASP 15 is in connection with the 3721™ server 11. The ISP 14 or ASP 15 contains its own database that may include their own personal or business information or telephone directories.

Further, as seen in FIG. 1A, the various electronic equipment may also be an intranet of a company, which contains an internal database of its own. Such an intranet database is normally used for intranet users only. When the intranet users need to search others' information, they may need to access the Internet or outside databases, such as the 3721™ server 11. On the other hand, the personal or business information of others may also be stored therein for use by the intranet users. Such personal or business information of others or publicly known information of the company needs to be updated from time to time. In this situation, a firewall is necessary to protect the confidential information in the intranet database.

Figure 1B:
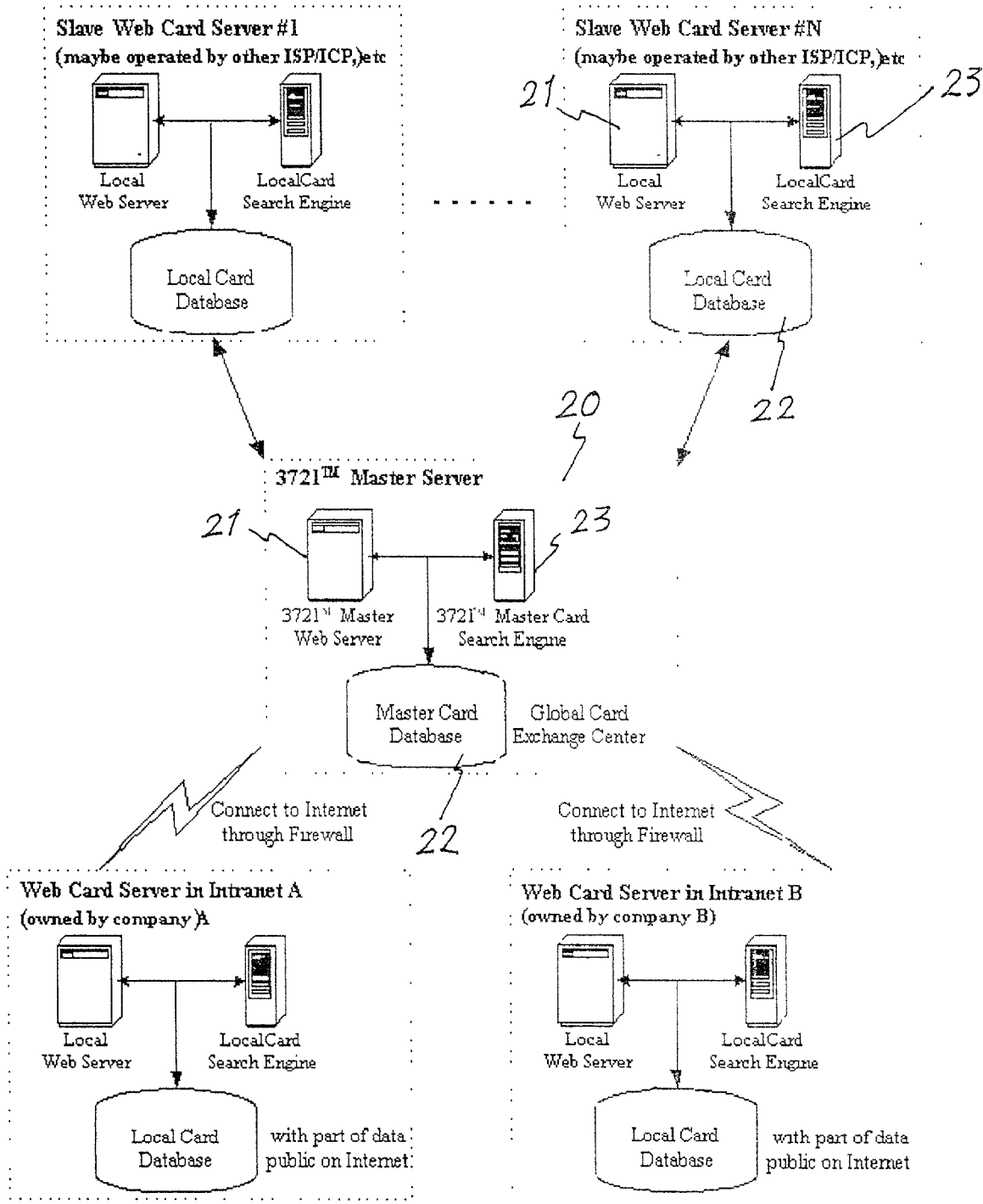
FIG. 1B illustrates a network system of the web card according to the present invention.

FIG. 1B illustrates the networking of the personal and business web card system of the present invention. Each block illustrates a web card server or a system unit. Each of such system or unit includes its own card database and card search engine. In consideration of the performance and load balance, each system may comprise one or more physical servers, for instance, one for the master or local web server 16, one for the master or local search engine, and one or more for the master or local database. A service vendor (ISP/ICP, etc.) may operate a web card unit independently, while the most important is that these web card units, although independent, can communicate with each other through specific built-in interfaces. Hence, such connected and communicated web card systems or units construct a global distributed web card system. Within such a global system 20, a user may search anyone's web card regardless with which vendor the desired person's web card is registered. Certainly, the users can communicate with each other through their web cards, such as, writing emails, notes, or exchanging web cards.

The global card search may be coordinated by the master card server, such as 3721™ server 11. The master server may coordinate the propagation of data synchronization of any updates between the slave servers. The master server may contain a global card exchange center, and all of the updates or data of the slave servers may be transmitted to the master server for passing on to another or other desired slave services for synchronization of these updates therewith. When a user conducts a search at a slave server, the search will not only performed by the local search engine of the particular slave server, but also be passed onto the master card search engine as described hereinafter with respect to FIGS. 5 and 6.

Figure 2A:
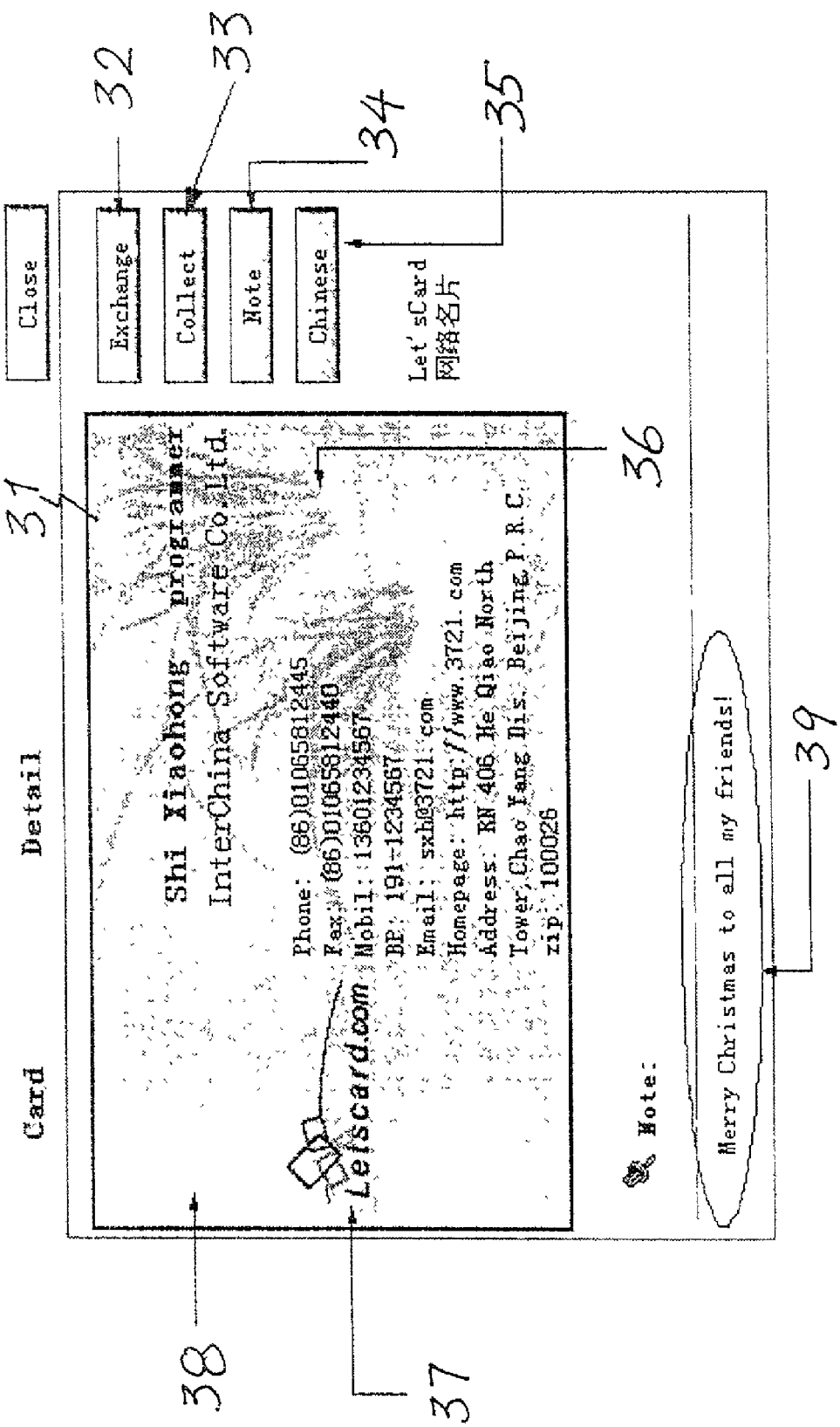

FIG. 2A shows the printout of real web card of the present invention. It can be seen that the personal information stored in the server 11 will appear in a card format 31, in analogy to a business card but much fancier. On the card, one can choose any available decoration 36, such as pet or flowers etc., a logo 37 and any background and color 38. As seen in FIG. 2B, the personal information contains a person's name, telephone number, and correspondence address (either street address or postal box). However, it may contain more information, such as name, address, website of the company where the person works, and telephone and facsimile numbers of the company, the person's cell phone number and email addresses and so on. When a searcher wants to find out a particular person, the search may reveal all of the necessary contact information.

However, none of such information is necessarily to show up on the card if the person chooses not to. Sometimes there is only a name shown up on the card to confirm the search result, while the interactive surface screen provides the searcher with options of communicating with the person being searched, who then may decide whether to contact the searcher. These options may include, but not limited to, personal message box (voice or written), public bulletin board, email box, box for exchanging cards, and even language selection. Assuming that the searcher left message or contact information to the person found through the search, he or she may then call or write back to the searcher if the person found is the right person and would like to communicate with the searcher. In any event, any personal information is sensitive and needs to be protected by all means. This aspect of privacy protection of the present invention is further disclosed in another co-pending patent application of the same assignee.

Figure 2C:
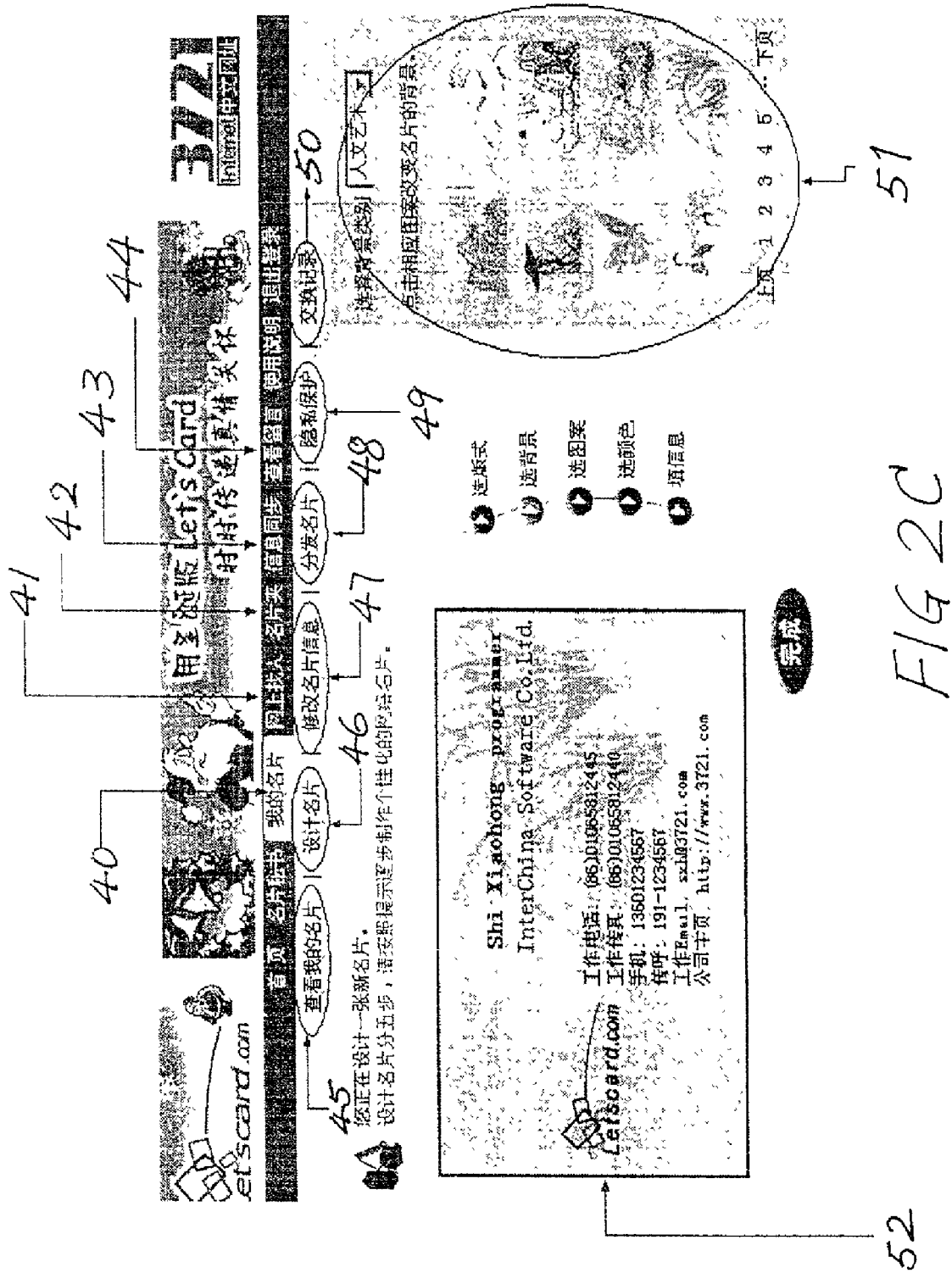

As shown in FIG. 2C, the features of the web cards of the present invention include my card folder 40, design card 46, search the net 41, and check message 44, etc. In "Design My Card" section 46, there are not just options of card appearances, but also entries of personal information and setting the level of privacy protection. As seen in FIG. 2B, the information about a person's work may include the person's name, company's name and address, the person's job title, telephone number, facsimile number, email, personal web page, mobile phone number, and pager, while the personal information may include the person's gender, age, residential address, home telephone number, etc. The most important feature is that the information entry may also contain more intimate data, such as marriage status, blood type, family physician or attorney, family history, health condition, educational status, location of past residence, date and place of birth, hobby, favorite books, movies, and even photos.

To most of people, they do not intend to disclose the aforesaid information to everybody, but almost always want to disclose such information to different groups of people. For instance, the people may be roughly classified into three groups. The first group includes social or business contacts, the second group is friends and relatives, and the third is family members. However, sometimes, one does not want anyone to know certain "intimate dada" except the ones who must know of the data. Therefore, some or most of the aforesaid "more intimate data" will not be disclosed without specific authorization of the person. Nonetheless, such data may provide a basis for a search. If someone by chance only knows or remembers a few pieces of such information, he or she may still conduct a meaningful search if the person being searched is indeed registered with a local web card system or the global web card system. The search result, however, may not necessarily display the whole lot of information to the searcher, but will at least let the searcher know whether such a person is there, for instance, identified at least by person's name being searched.

FIG. 2C also shows that the interactive screen contains my favorite card folder 42, synchronization 43, modification of web card information 47, distribution of web cards 48, and privacy control 49, card exchange record 50, and selection of background and design area 51. These features are just designed for the users convenience. This will give users more freedom of exercising control of sending and receiving the web cards, such that the personal and business card can be distributed to and synchronized with attempted recipients of the registered user's choice, and the card may be searched by any others with the limitation of the registered user's choice.

Figure 3A:
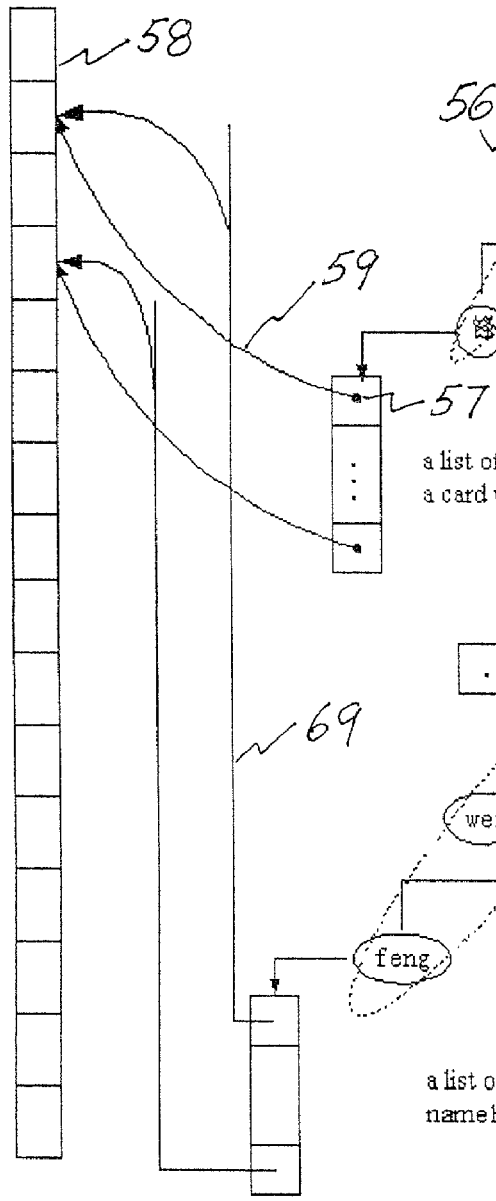
FIG. 3A shows a conventional arrangement of the data structure for the exact matching search.
Figure 3A:
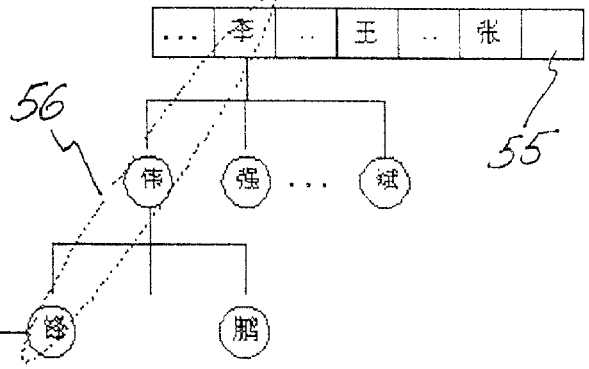
Figure 3A:
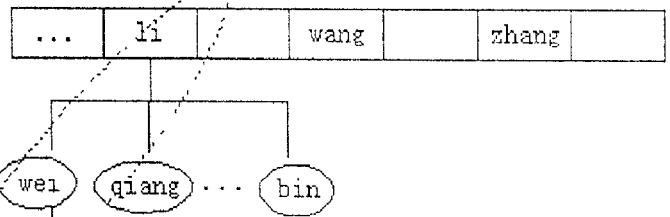
Figure 3B:
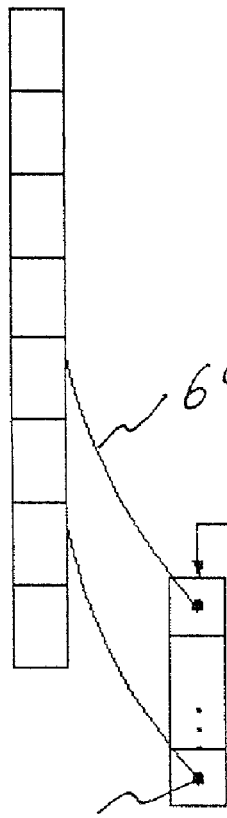
FIG. 3B shows an arrangement of the data structure of the present invention.
Figure 3B:
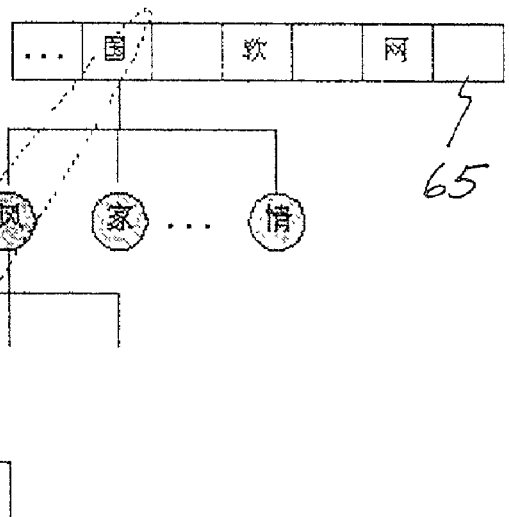

FIG. 3A illustrates the data structure adopted by the card search engine 23 to carry out the conventional search of exact or accurate matching. FIG. 3B illustrates the data structure adopted by the card search engine 23 to carry out a fuzzy or approximate search method in accordance with the present invention. The web card search engine 23 of the present invention performs both of the exact or accurate matching search as well as fuzzy or approximate search. The web card search engine 23 does not use the database of conventional relationship (RDBMS) to carry out the search. To ensure the search speed and efficiency, the specific data structure and indexing structure are established completely in the memory 58.

As seen in FIG. 3A, the key is to set up highly efficient fast indexing in addition to the establishment of the memory structure of the stored web card data therein (e.g., adoption of array and link lists, etc.). The web card search engine 23 utilizes a Hash table 55 and hierarchical structure index 56 to carry out the accurate search of name, and pin-yin (phonetic spelling) and homophony. In the search engine 23, the card data and the index data are all in the form of Unicode. Take the Hash table 55 and hierarchical index tree 56 for accurate or exact matching search as an example. The Hash table 55 is a table containing entries of all 64K characters of the Unicode. Under each entry, there is a branch of the hierarchical tree; each node 57, as shown in dot, contains a pointer 59. Each of such pointers 59 leads to a position of the actual card data stored in the memory. And the names of these cards are the same as the name constructed by all of the characters along the route from the entries of the Hash table to the nodes. Therefore, the accurate search based on names is a process of locating nodes and pointers in the hierarchical tree as illustrated in FIG. 3A. The structure of Hash table plus hierarchical index tree for pinyin or homophony search is similar to that of the search based on characters. The only difference is that the phonetic alphabetic letters, instead of characters, appear at the nodes of the hierarchical tree and the entries of the Hash table.

FIG. 3B illustrates an index structure established for carrying out the fuzzy search at the web card search engine 23. The index structure of FIG. 3B is similar to that of FIG. 3A. However, the characters form Chinese words or a phrase, as they are constructed at nodes 57 from the Hash table 55 to the hierarchical tree 56. Each node 57 contains a card pointer 59. Each pointer 59 leads to the name of the name card or other additional information containing such a word. FIG. 3B is in fact a reversed index based on searching words.

The index structure in FIGS. 3A and 3B are dynamically maintained. That is to say when the user applies for or modifies a web card, the information of this web card will be transmitted to the web card search engine, including the additional searchable information of all characteristics of the card. The search engine 23 will add such information to the two branches of the hierarchical index tree in FIG. 3A in accordance with the name of the card and its Chinese phonetic spelling. At the same time, the additional information and the name of the card will be divided into several words, and these divided words are added into the index pointers 59 corresponding to the nodes 57 of the index tree in FIG. 3B.

At present, almost all of the countries have their specified sets of characters, for instance, the specified set of Chinese characters GB2312. These sets of characters may have correspondence with the set of characters of Unicode. Therefore, the web card search engine uses Unicode characters as the encoding format to store the web card data, such that the search mode of the web card search engine of the present invention may be adopted easily for other languages, such as Japanese and Korean, etc.

Figure 4A:
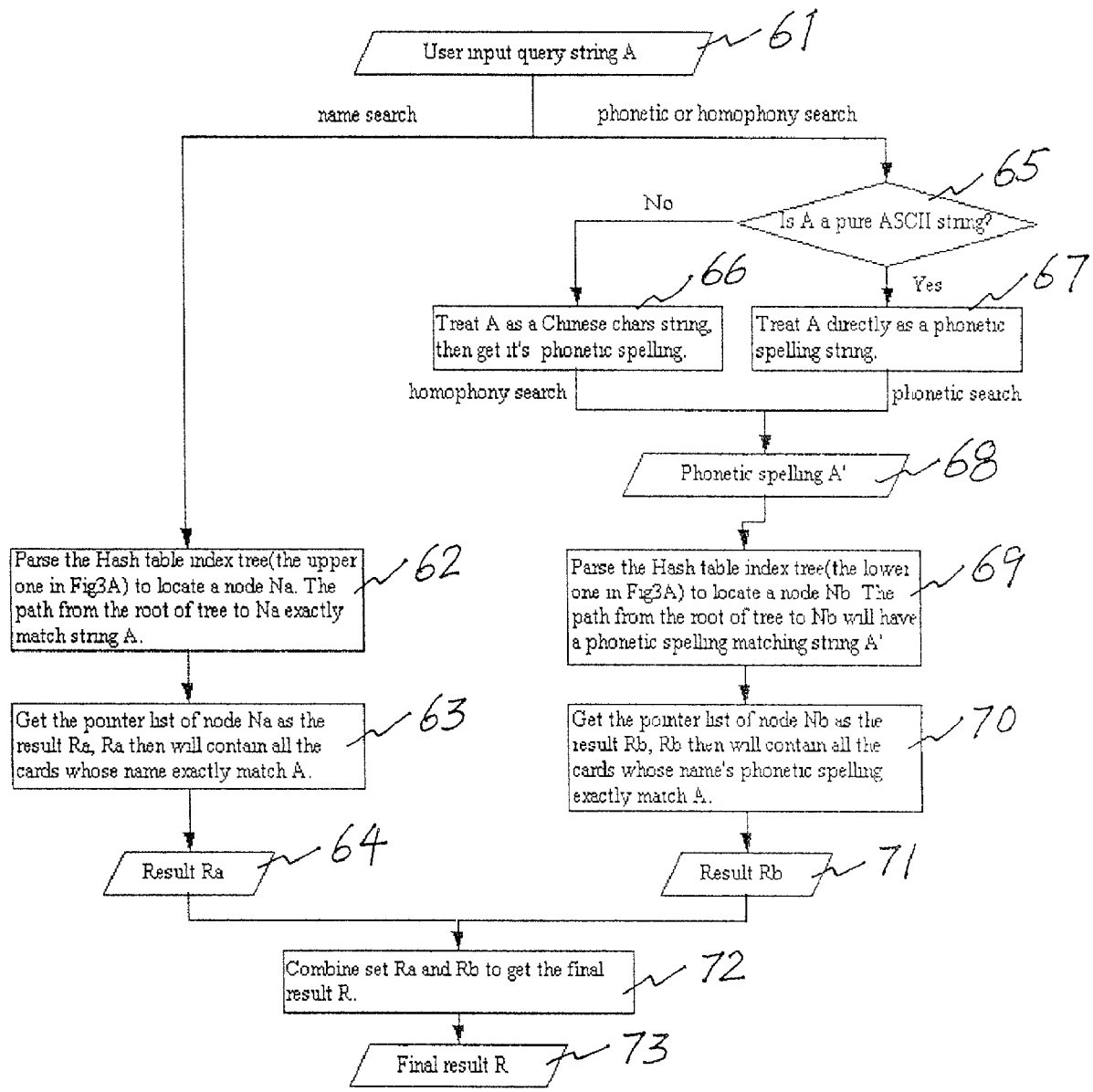
FIG. 4A is a flow chart of the conventional exact matching search.

For the detailed description of the web card search of the present invention, FIG. 4A illustrates the flowchart of the search process using the accurate or exact matching search. Under the accurate or exact matching search, the search for a name is carried out by inputting 61 inquiry string A, treating the character stream A of the inquiry as the exact matching words for the name. Based on the first character of the character stream A, it will be easy to locate an entry in the Hash table 55 of FIG. 3A. Then, the following process is to find 62 a node Na within the hierarchical tree connected to this entry, to have the character corresponding to Na being equal to the last character of the character stream A of the inquiry. When the characters from the Hash table entry to the node Na are combined together, they should form the characters stream A of the inquiry. This is a traditional computing method, and its time complexity is O(N), wherein N is the length of the character stream of the inquiry. When the node Na is found, the content directed by the index pointer 63 contained in the node Na will be the desired web cards Ra with all cards matching the inquiry. If such a node is not found, it means that all of the web cards as stored in the memory 58 do not have anything matching the character stream A of the inquiry.

For the same accurate search mode, but based on phonetic spelling or homophony search, it will be substantially the same with such search for characters of the web card as described above. First, it will determine at 65 whether the entered inquiry A is a pure stream of ASCII characters. If yes, treat the inquiry A as the pin-ying string 67. Then, the pin-ying string may be divided into several phonetic units in accordance with the Chinese phonetic spelling rules. Such phonetic units constitute a stream of phonetic spelling A' 68. If the inquiry A contains not only the phonetic spelling alphabetic letters, but also Chinese characters as seen in the step 66, the Chinese characters can be converted into equivalent phonetic units through the conversion table stored in the memory 58. Thus, the stream A' 68 of phonetic spelling can be obtained easily from the stream A of the initial inquiry. Then, the pertinent nodes Nb may be found 69 for the stream A' through the index structure as shown in FIG. 3A. Subsequently, the pointer may be found to indicate the result Rb at the step 70 and 71. This process is the same as the process for searching the characters, i.e., the accurate or exact matching search. When combining the results Ra and Rb at the step 72, the final result R may be obtained at the step of 73.

Figure 4B:
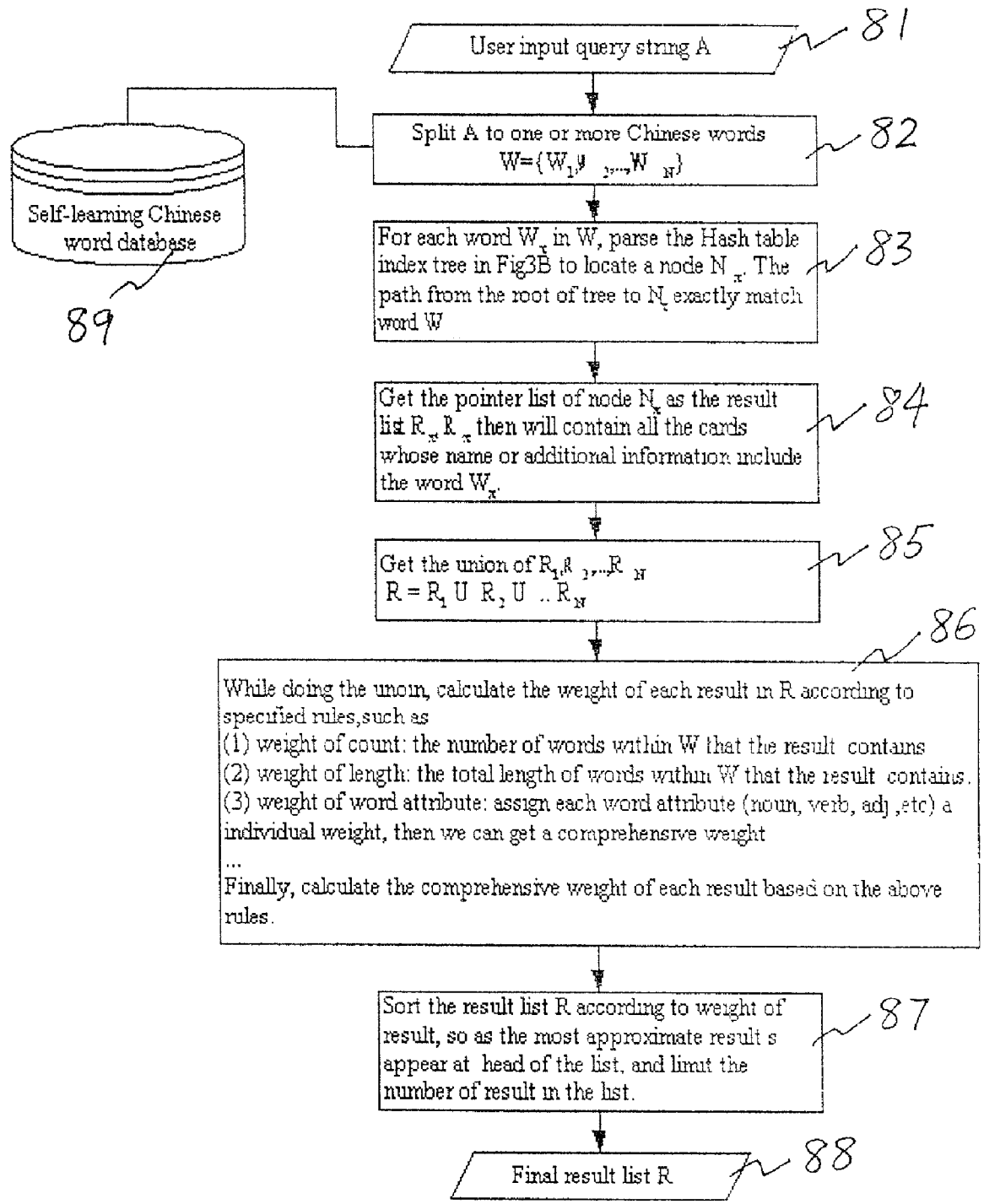
FIG. 4B is a flow chart illustrative of the fuzzy search of the personal and business web cards according to the present invention.

FIG. 4B is the flowchart of the fuzzy or approximate search in accordance with the present invention. As shown in FIG. 3B, the index structure of the fuzzy or approximate search is the same as the structure of the accurate or exact matching search. For an inquiry character stream A inputted at the step 81, such as "I would like to find XYZ who works in Beijing for an IT company" in Chinese "我想找在北京做 IT 工作的XYZ" the search engine 23 will break down, at the step 82 the inquiry into several words through a dictionary having self-study ability. Such words constitute a collection W. At the step 83, each word Wx is being dealt with in accordance with the way of computing same as the one for the accurate or exact matching search so as to locate a node Nx among the index structure of FIG. 3B. From each node Nx, a result collection Rx is generated at the step 84. The result collection Rx contains the web cards that have the name or additional information including the word Wx. All of the result collections Rx are consolidated to constitute a big result collection R at the step 85. During the consolidation, the similarity of each card may be evaluated by weight at the step 86. Such similarity may follow certain specific rules. Finally, all of web cards in the big result collection R are sorted out at the step 87 and arranged in accordance with the similarity, and the number of selected search results of web cards is restricted under certain rules so as to obtain the final search result collection R of the fuzzy or approximate search at the step 88.

Figure 5:
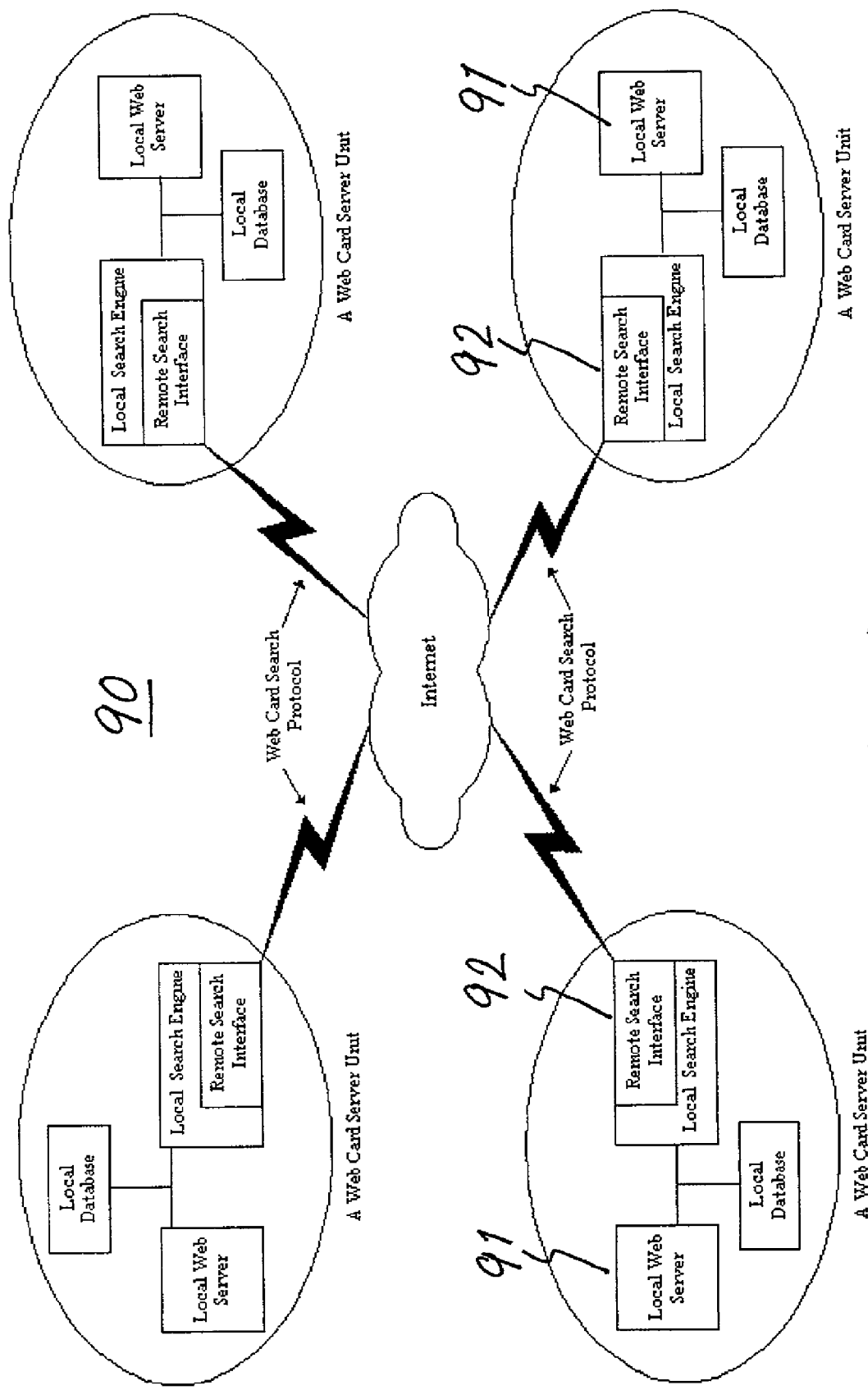
FIG. 5 is an illustration of a global network of systems of personal and business web cards according to the present invention.

With respect to FIG. 5, it can be understood that due to the different cultural backgrounds and languages, there is a necessity that an interface may be provided between the servers for transmitting a search inquiry from one local web server to a remote web server, and also a necessity that each web card search equipment may have a screen interface that assists all kinds of users to communicate with a local web server as well as remote web servers.

In the distributed network 90 without a central control server, as shown in FIG. 5, the network of systems of personal and business information or web cards enables a searcher to search anyone of the web card server units, that provide services of web card search of personal information. For instance, each web card server 91 has a particular group of people signing up with the server. Each person signing up with the server may only remember the website of this particular server, but the person may want to search from other remote web card servers as well. Thus, each of the web card servers 91 has established protocols with other web card servers in the distributed network 90, and is equipped with an interface 92 which operates such protocols such that a search inquiry placed at one particular web card server may be passed simultaneously, through the interface of the protocols, to all remote web card servers that have the established protocols with the particular web card server. The search can then be done simultaneously at all remote web card servers.

However, the user or searcher may have an option as to whether or not a full search is desired. Otherwise, the searcher can choose only one or more specific web card servers for the possible search. Such a selection can be based on any geographic regions, countries, states, provinces, counties, cities, and so on. It is the protocols that should work in a uniform language, and have ability to process the search inquiry placed in one language with this specific uniform language and to pass it on to other web card servers that may operate in different languages. Likewise, any search result may be sent back to the original web card server to inform the searcher who places the search inquiry.

It can be understood that almost everyone has his or her name spelled in native language as well as at least in alphabetic letters. Searches can be classified as a search of someone completely unknown to the searcher or a search of someone who somehow became known to the searcher before. For the former, a full search may have to be done, but for the latter a description of such person is possible for the search. The description can be either in a particular native language or in English, such as "so and so was in where, in what year, and/or doing what." Therefore, it is very likely that the uniform language operating the protocols may be English or a specific set of Unicode that translates the various sets of Unicode for different languages.

Nonetheless, the network of FIG. 5 may not be easily synchronized to keep the updates of all web card servers. It would require that one web card server be in connection with all other web card servers so that an update of a piece of personal information or data in a local web card server can be simultaneously updated at other web card servers. It would require the server unit having the update keep its update alert as long as possible so as to permit other web card server to keep up with the change. Thus, anyone signs up with the other web card servers may update his or her own records or organizers.

Figure 6A:
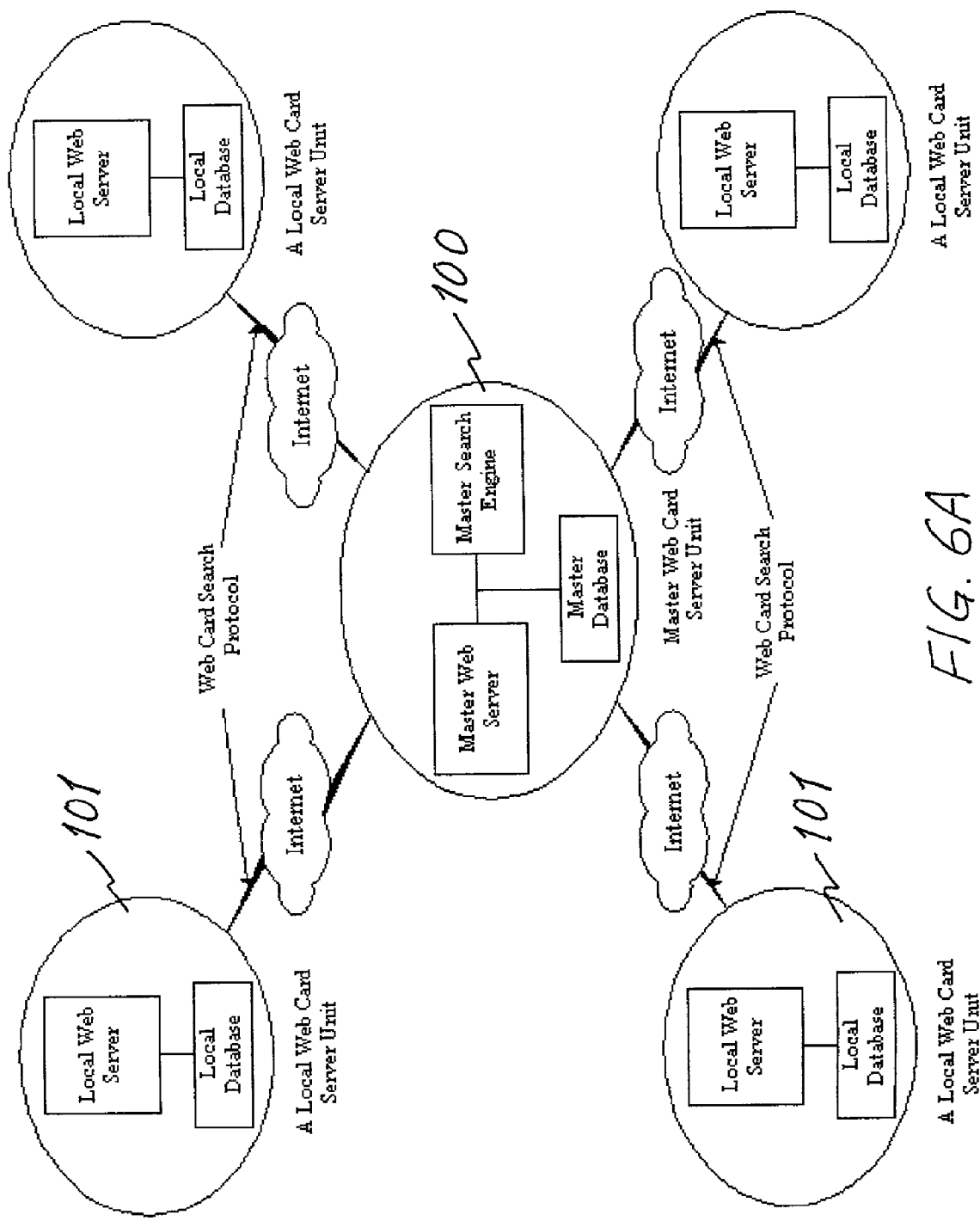
FIGS. 6A and 6B illustrate the centrally controlled global network of systems of personal and business web cards according to the present invention.
Figure 6B:
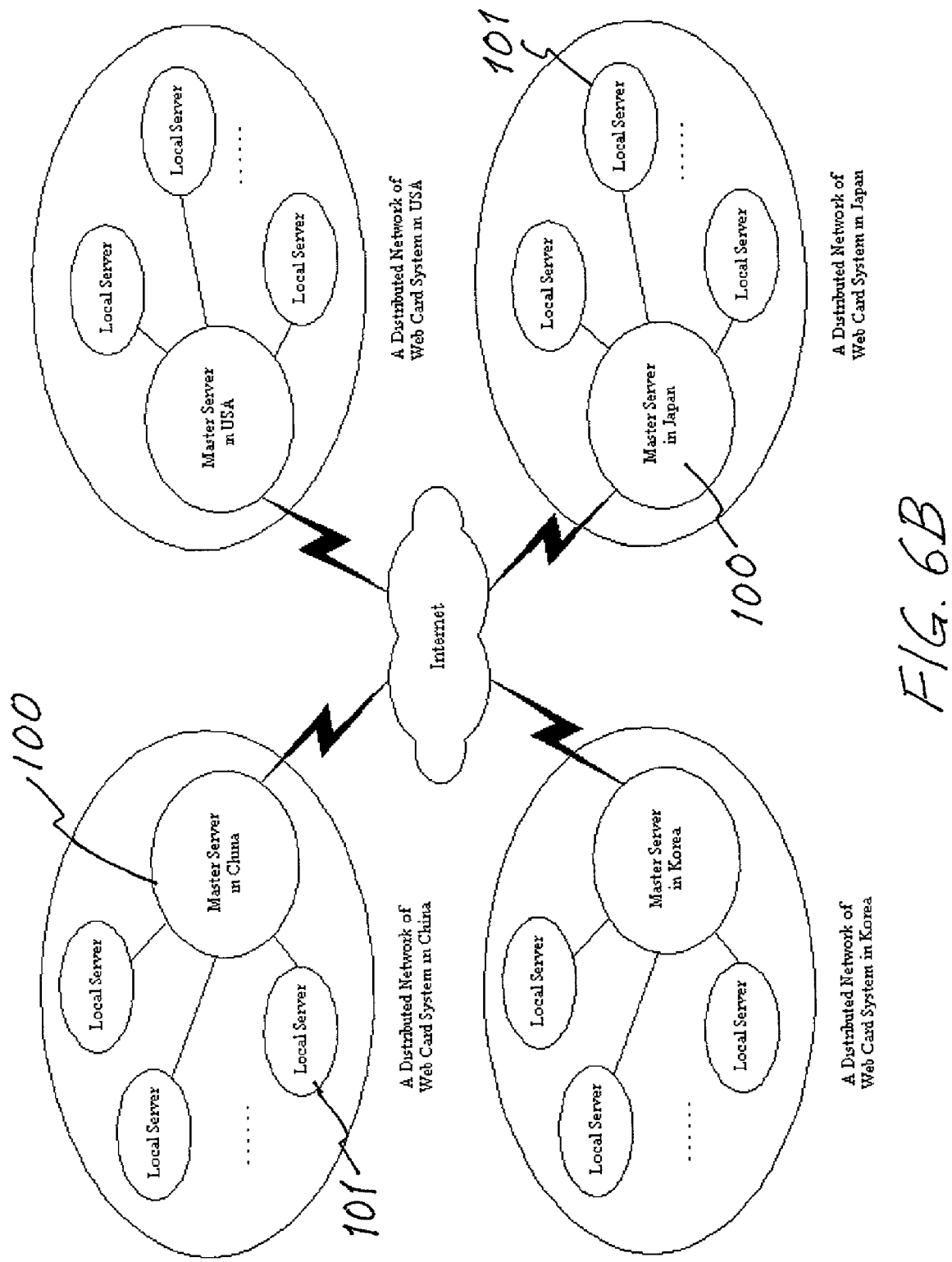

FIGS. 6A and 6B illustrate, respectively, a network of systems of personal and business web cards, which comprises a central master server unit 100, and a plurality of local web card server units 101. The local web card server units 101 are in connection with the central master server unit 100. In this architecture of network, the personal information stored in the local web card server 101 may always have an update alert indication at the central master server unit to let any searcher know of where an update occurs and even send out a notice to others who had prior search inquiry to a particular person of the update. The update indicator alerts only the persons who had previous contact with the person of the update and who are allowed to get the information being updated.

Normally, the web card personal information contains a person's name, telephone number, and correspondence address (either street address or postal box), and may also include the information of name, address, website of the company where the person works, and telephone and facsimile numbers of the company, the person's cellular phone number and email addresses and so on. Further, the personal information may also include more intimate information, such as the person's gender, age, residential address, and home telephone number, and even marriage status, blood type, family physician or attorney, family history, health condition, educational status, location of past residence, date and place of birth, hobby, favorite books, movies, and even photos. The more private and intimate information may assist the search, but is not necessarily displayed on the web cards.

Therefore, to each searcher who does not have previous contact, the searcher may not get all the details of the person registered at the web card server, but may still find the person at the web card server with a limited indication of search result. The searcher will then be given options of leaving a message at personal message box (voice or written), public bulletin board, email box, and card exchange box etc. Similarly, the updates will be sent to the persons who are entitled to know the information. This aspect of privacy protection of the present invention is further disclosed in a co-pending patent application of the same assignee. Therefore, when an update occurs, the master server unit will deliver the updated information only to certain people based on the privacy protection level.

In the centrally controlled network of systems of web cards, the master web card server 100 is in charge of transmitting all search inquiries, and passing the updates. Thus, each of other web card servers 101 may establish only one protocol with the master web card sever 100. As shown in FIG. 6A, each of the web card servers 101 may be located in a country, while the master web card server 100 may be in any country so long as the other web card servers can be connected to it.

As shown in FIG. 6B, there could be a master web card server for each country, such as one in the United States, one in China, one in Japan, and one in Korea. In this network, only those master web card servers are equipped with an interface with operational protocols for connection among the master web card servers. This is like a distributed global network of master web card servers, while each master server establishes a centrally controlled network of systems of personal web cards.

The scope of protection of the present invention is set out in the following claims. However, any obvious modification without excess of the essence of the present invention should also be within the scope of the present invention.

What is claimed is:

1. A network of systems of personal and business web cards, comprising a plurality of servers with which users may sign up to keep their contact information and through which the users may search others' contact information, each of said servers having at least a database, a search engine, and at least one search interface, wherein a plurality of said servers are equipped with at least one interface having protocols working in a uniform operative language established to connect with each other, and wherein when a user places a search inquiry at a first server local to the user, the inquiry is simultaneously forwarded to a plurality of other servers having the same protocols established with the first server so that any search inquiry is simultaneously performed not only at the first server but also at said plurality of other servers, wherein said protocols of the interface are capable of transforming a search inquiry placed in a first human language into one or more other operative human languages, thus enabling the transmission of search inquiries between servers that operate in different languages.

2. A network of systems according to claim 1, wherein the uniform operative language of said protocols is Unicode that has correspondence with other Unicode of different languages.

3. A network of systems of claim 1, wherein the user can designate, in the inquiry, a particular set of said servers that have protocols established with the first server.

4. A network of system of personal and business web cards, comprising a plurality of servers with which users may sign up to keep their contact information and through which the users may search others' contact information, each of said servers having at least a database, a search engine, and at least one search interface, wherein there is one designated server among the plurality of servers that functions as a master server that is equipped with at least one interface having protocols working in a uniform operative language established to connect with the other servers, as slave servers, the master server being capable of transmitting any search inquiry simultaneously to the slave servers, wherein said protocols of the interface are capable of transforming a search inquiry placed in a first human language into one or more other operative human languages, and thus enabling the transmission of search inquiries between servers that operate in different languages.

5. A network of systems according to claim 4, wherein said master server is capable of passing on any updates that a user placed at one of the slave servers to designated servers.

6. A network of systems according to claim 4, wherein said protocols of the interface are capable of transforming a search result into the language corresponding to the language of the search inquiry, and thus transmitting the result back to the server placing the search inquiry.

7. A network of system according to claim 4, wherein said master server has automatic synchronization function to transmit updates to all designated servers whenever an update occurs.

8. A method of managing and controlling a network of systems of personal and business web cards, each of said systems including at least a web card server having at least a search engine and a database, said method comprising:

connecting a plurality of web card servers through the Internet;

establishing protocols working in a uniform operative language between a plurality of said servers to enable communication between them including transmission of search inquiries therebetween;

installing said protocols, respectively, in the plurality of said servers that communicate with each other;

identifying said protocols between the servers to establish connection and communication therebetween; and transmitting a search inquiry from a first server to a plurality of other connected servers so that the search inquiry is simultaneously performed not only at the first server where the inquiry is placed, but also at the plurality of other servers, wherein said protocols of the interface are capable of transforming a search inquiry placed in a first human language into one or more other operative human languages and thus enabling the transmission of search inquiries between servers that operate in different languages.

9. A method of claim 8, further comprising designating at least one of said web card servers as master server, and installing said protocols in said master server such that the master server is capable of communicating with all of said servers and transmitting the search inquiry and web card information to the servers, including any update of said web card information.

10. A method of claim 8, further comprising designating one master server for each of a plurality of regions, and having all designated master servers installed with pertinent protocols that enable communication between said master servers and transmission of web card information and search inquires among said master servers.

11. A method of claim 10, wherein each of said master servers are capable of flashing an update that occurs within a corresponding system of personal information web card, and transmitting such an update to other master servers having designated users, that in turn transmits the update to the designated user so as to synchronize all personal information data files of all designated users.

12. A method of claim 8, wherein said protocol is operative in a uniform Unicode corresponding to Unicode of different languages.

13. A network of systems of personal and business web cards, comprising a plurality of servers with which users may sign up to keep their contact information and through which the users may search others' contact information, each of said servers having at least a database, a search engine, and at least one search interface, wherein said servers are divided into groups such that each group comprises one designated master server and one or more slave servers, and within each group the master server is equipped with at least one interface having protocols working in a uniform operative language established to connect with the slave servers within the same group, and is capable of transmitting a search inquiry to the slave servers, and wherein the master servers are equipped with at least one interface having protocols working in a uniform operative language established to communicate with at least one of the other master servers such that a search inquiry can be transmitted among the master servers, wherein when a user places a search inquiry at a first server local to the user, the inquiry is simultaneously forwarded to a plurality of other servers, and wherein said protocols of the interface are capable of transforming a search inquiry placed in a first human language into one or more other operative human languages and thus enabling the transmission of search inquiries between servers that operate in different languages.

14. A network of systems of claim 13, wherein each of the master servers is capable of transmitting an update to the slave servers within the same group and other master servers.

15. A network of systems according to claim 13, wherein said servers communicate with each other through a reciprocal uniform search interface with predetermined protocols between said servers.

16. A network of systems according to claim 15, wherein each of said predetermined protocols is operative at least between two of said servers in consideration of the operative languages of said two servers.

17. A network of systems according to claim 15, wherein said predetermined protocols of said servers are operated in Unicode that has correspondence with other Unicode of different languages.

18. A network of systems according to claim 15, wherein said protocols of the interface are capable of transforming a search result into the corresponding to the language of the search inquiry, and thus transmitting result back to the server placing the search inquiry.

* * * * *